United States Patent [19]
Nagarajayya et al.

[11] Patent Number: 6,038,588
[45] Date of Patent: Mar. 14, 2000

[54] METHOD AND APPARATUS FOR CREATING AND EXECUTING A PROGRESS DIALOG WINDOW

[75] Inventors: Nagendra Nagarajayya, San Jose; Bangalore Madhuchandra, Milpitas, both of Calif.; Xavier de Saint Girons, Chambourcy, France; Vincent Vandenschrick, Antony, France; Thierry J. Lobel, St. Mande, France; Marc D. Moss, Fremont, Calif.; Fabrice Keller, Plaisir, France

[73] Assignee: Sun Microsystems, Inc., Mountain View, Calif.

[21] Appl. No.: 08/884,765

[22] Filed: Jun. 30, 1997

[51] Int. Cl.⁷ ........................................................ G06F 9/00
[52] U.S. Cl. ................................................................ 709/102
[58] Field of Search .................................. 709/100, 101, 709/102, 106; 345/3

[56] References Cited

PUBLICATIONS

Flanagan, David Java In a Nutshell, 2nd Edition, O'Reilly & Associates, Inc., Sebastapol, CA.

Kadel, Rich, Generic Client–Server Classes, Aug. 15, 1996, Internet:javaworld.com/javaworld.

Cameron, Jamie JFS, Internet:jcameron@letterboxl.com.

*Primary Examiner*—Majid A. Banankhah
*Attorney, Agent, or Firm*—Beyer & Weaver, LLP

[57] ABSTRACT

A method, apparatus, and computer readable medium for creating, updating, and displaying a modal progress dialog window containing a job-specific progress indicator is described. The modal progress dialog window is updated while the job, typically a user-invoked function within an application, is running. As a modal dialog window, its creation is accompanied by the creation of a second thread. The second thread works in conjunction with a host application thread to create, display, refresh, and dispose the progress dialog window. Because the host thread and the second thread are able to alternate control of the progress dialog window, the progress indicator within the window is updated and displayed at meaningful intervals upto job completion on a display monitor while the job is running.

11 Claims, 5 Drawing Sheets

METHOD AND APPARATUS FOR CREATING AND EXECUTING A PROGRESS DIALOG WINDOW

BACKGROUND OF THE INVENTION

The present invention relates generally to user interface software run on computers and specifically to a method and apparatus for displaying and executing a progress dialog window inside a software application showing the progress of functions invoked by a user. The progress dialog window is updated while the background function that was invoked by the user is executing.

With the advent of the graphical user interface (GUI) on computer systems came the increasingly common practice of informing a user of the progress of any past or functions invoked by the user within the application. This practice has become popular because it is interactive with the user and keeps the user apprised of how the function or task invoked is progressing. Such a progress indicator has the advantage of informing the user that the function is in fact executing and is progressing to completion and it has the other advantage of letting users know how quickly a particular function may progress and this is particularly useful when a function takes a significant amount of time thus allowing the user to abort the function if necessary.

One problem that has been encountered in implementing progress dialog windows in programs written for execution on the Java™ virtual machine is that the non-modal windows provided permit a host application to continue executing even after the dialog window has been created. As a result, the dialog window does not appear on the display monitor until after the user-invoked job (i.e. the job whose progress is intended to be shown in the dialog window) is completed. The progress dialog window could not be updated and painted accordingly on the screen until after the job was complete. Showing the dialog window after the job is complete is of no benefit to the user other than informing the user that the job is completed, for which there are other less intrusive and more efficient methods.

In object oriented systems such as the Java™ virtual machine, it is desirable for an application to be capable of displaying a progress dialog window showing updates while the invoked job is running while using the tools provided. The present appliation provides one mechanism for implementing such progress dialog windows.

SUMMARY OF THE INVENTION

Accordingly, the present invention provides a method, apparatus, and computer readable medium for showing the progress of the execution of job through the use of a job-specific progress indicator during while the job is executing. In one embodiment, a method of creating a modal progress dialog window and updating the window to reflect the execution of a job using a host application thread is disclosed. In this aspect of the invention, the system creates a second thread that calls a run procedure, associated with the host application thread, to update the progress dialog window. The progress dialog window is updated while the job is executing and is refreshed on the screen to reflect the updates. The system then determines when the job is done and terminates the second thread thereby continuing normal execution of the host thread.

In one embodiment, the second thread is used to hide the modal progress dialog window after the job is done. The second thread itself is then terminated and the progress dialog window is disposed of by the host thread after the window is hidden. In still another embodiment, the progress dialog window is created from a progress dialog object, which also initiates creation of the second thread. In yet another embodiment, the progress dialog object includes properties and methods of a progress dialog class and the second thread is a progress dialog thread.

BRIEF DESCRIPTION OF THE DRAWINGS

The invention, together with further objects and advantages thereof, may best be understood by reference of the following description taken in conjunction with the accompanying drawings in which.

DETAILED DESCRIPTION OF THE PREFERRED EMBODIMENTS

When running a software application, a user can typically invoke various functions or tasks within that application. Function types can be diverse ranging from downloading a Java™ applet off of the Internet to printing a spreadsheet. The amount of time a function takes can also vary widely and can depend on several factors. Commonly these tasks or functions are referred to as jobs and are normally invoked while the application is up and running. These jobs can take a certain amount of time and in many graphical user interfaces today the user is kept apprised of the progress of the completion of the job through the use of a progress dialog box. The progress dialog box which contains a progress indicator usually appears on top of the software application as displayed on the monitor and disappears once the job is complete. This feature has proved to be useful in keeping the users apprised of how long a particular task can take and allowing the user to either abort the task or continue it to its completion.

Figure 1A:
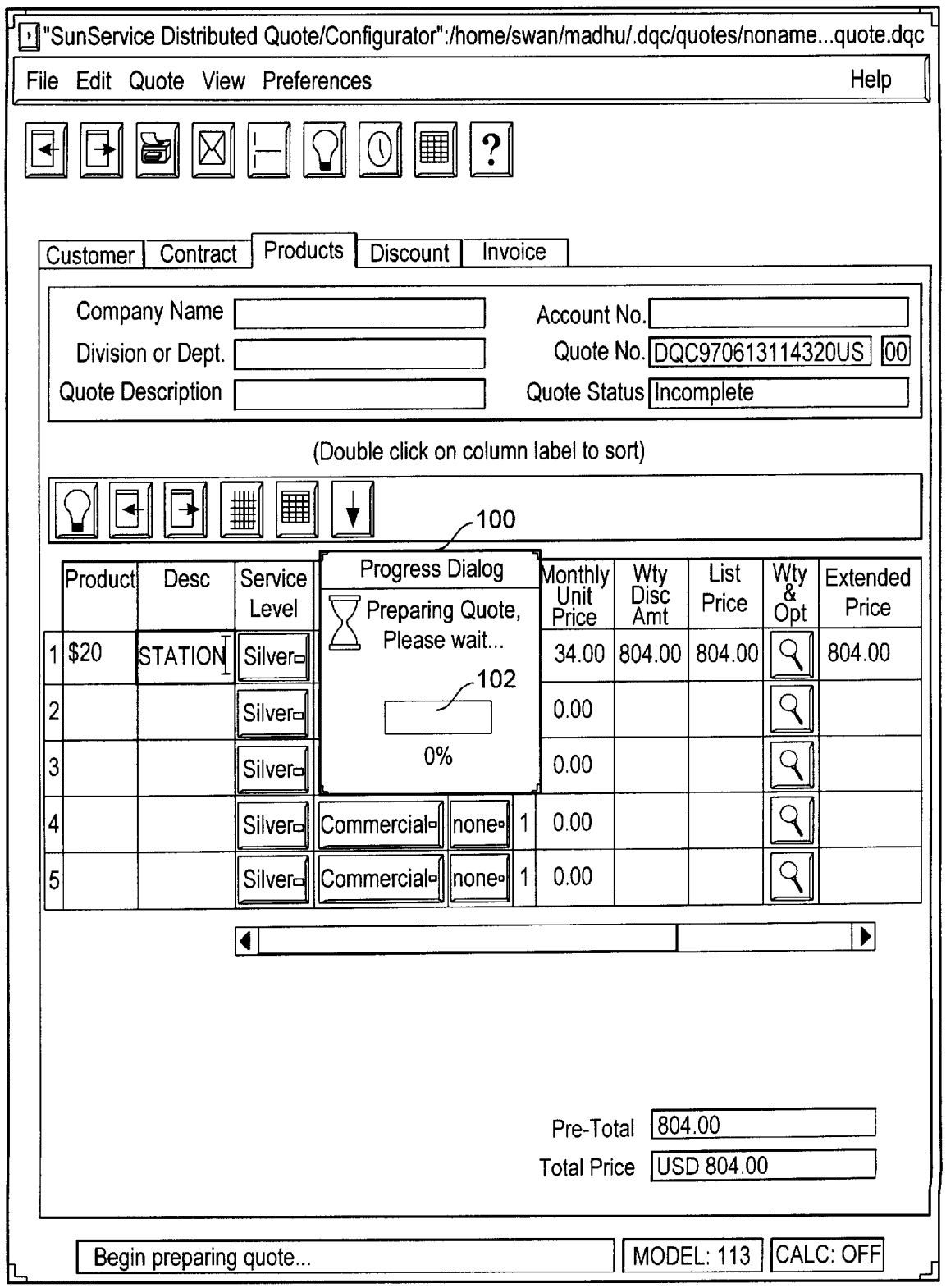
FIG. 1A is a screenshot showing a software application called "Sun Service Distributed Quote/Configurator" and a progress dialog box containing an empty progress bar in the middle of the screen.

FIG. 1A is a screenshot showing a software application called "Sun Service Distributed Quote/Configurator" (Sun Service DQC). The figure contains an icon menu along the top and an area to enter data relating to a variety of categories directly below it. Below that is another icon toolbar giving the user further functions to choose from and a table made up of rows and columns. The user can invoke several functions within this application by clicking on an icon or pulling down a menu item from a menu panel. In FIG. 1A, the function chosen by the user is preparing a price quote for a particular product.

Before the user invoked this job, the application was executing a host thread, a thread being a series of operations or instructions executed by an application or function. In the described embodiment, the execution of the application, in this case the Sun Service DQC, is manifested through a host thread. Thus, if the host thread is controlling the system, the main application is running. In other preferred embodiments, there maybe more than one main application open. In that event, the host thread is executed by the application that is currently executing. In the described embodiment, once the user chooses to execute a function, such as preparing a price quote, a progress dialog box 100 appears on the screen overlaying the application display. In FIG. 1A the progress dialog box 110 is surrounded by a black border and is in the center of the screen. It contains a line of text which reads "Preparing Quote, Please Wait . . ." and also contains an icon next to the text string meant to indicate time. In FIG. 1A, a progress indicator bar 102 shows zero percent completion and, thus, is empty. Once the progress dialog box or window 100 is on the screen and is being updated as the job is executing, a progress dialog thread has been activated and has control of the system thereby blocking the host thread. Control is transferred to the progress dialog window 100 which allows the window to be updated while the function is running. The steps describing this method are discussed in greater detail in regard to FIGS. 3A and 3B.

Figure 1B:
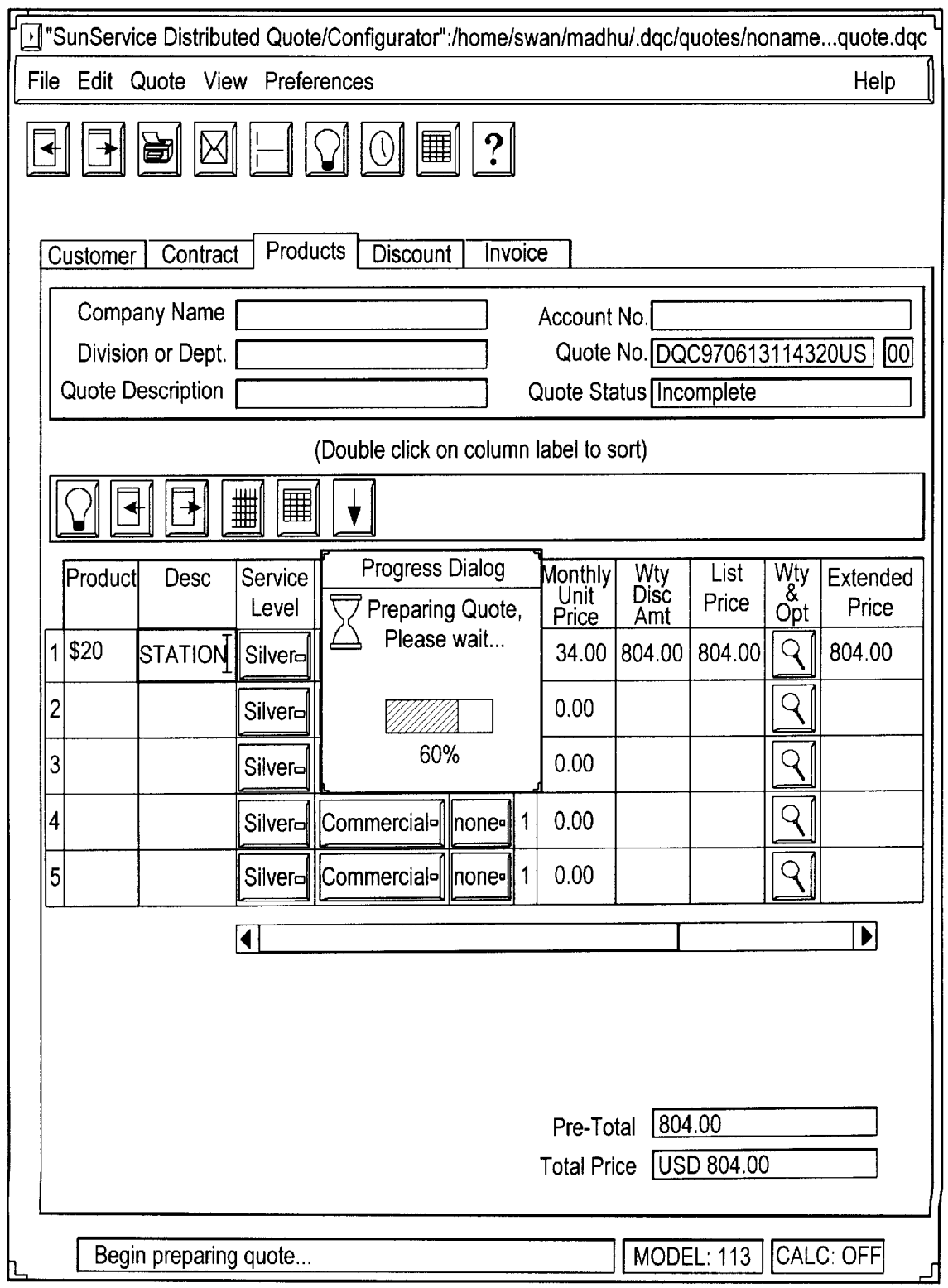
FIG. 1B is a screenshot of the same application and progress dialog box shown in FIG. 1A except now the progress bar is partially darkened.

FIG. 1B is a screenshot of the same application and progress dialog box shown in FIG. 1A. The difference is that the progress dialog window 100 shows that 60% of the function is complete as indicated by a progress indicator bar 102 that is approximately 60% full. In the described embodiment, the progress indicator is graphical as shown in FIG.s 1A and 1B. In other preferred embodiments, the progress indicators can have other more elaborate forms using, for example, animation or sound. In addition, the progress indicator does not have to appear in the center of the screen. It can appear at the bottom of the screen or at any other location on the display monitor. Once the function is complete, the progress dialog window is removed from the screen and the user continues with the application.

Figure 2A:
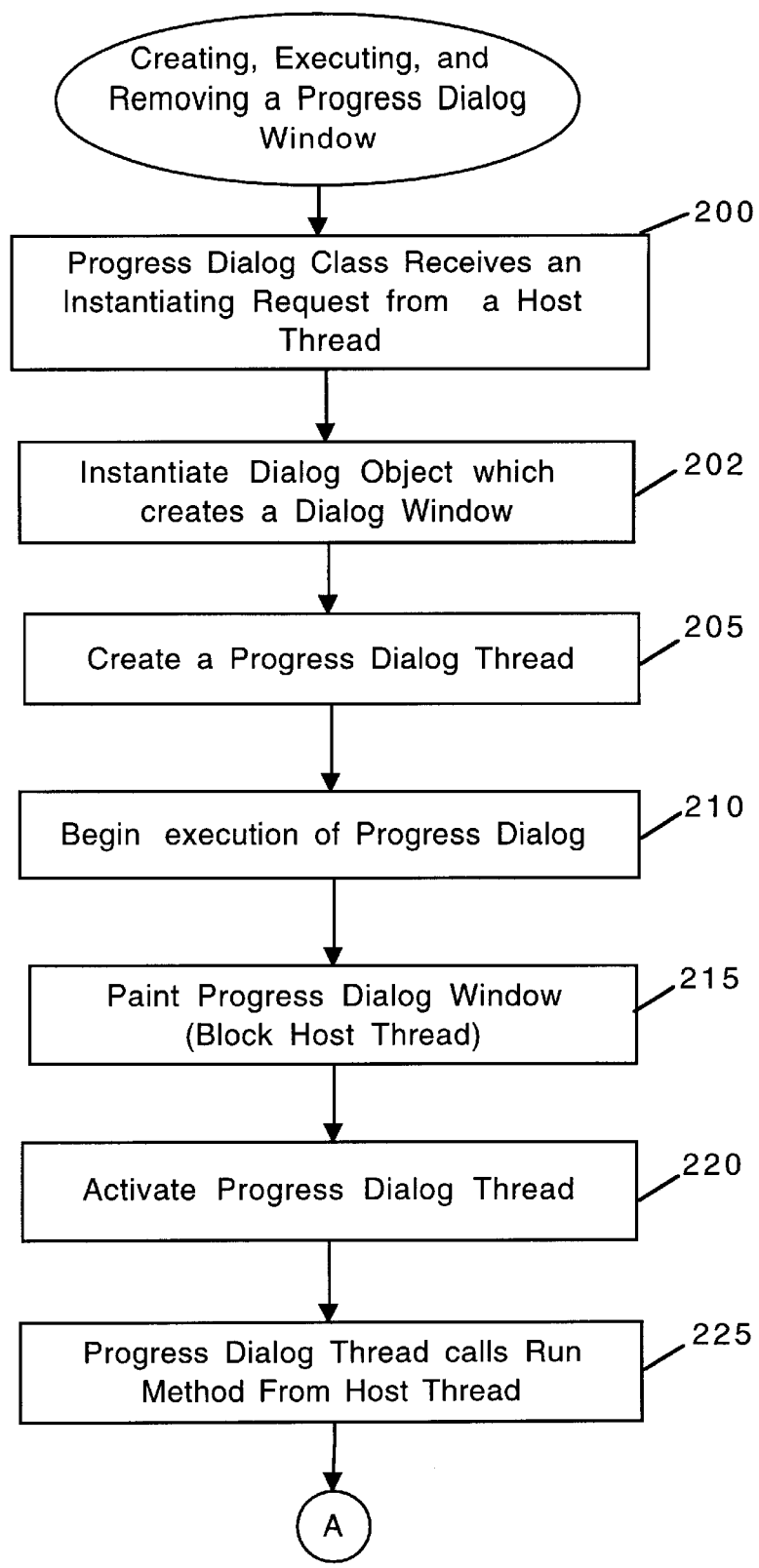
FIGS. 2A and 2B are flowcharts illustrating the steps taken in creating, executing, and removing a progress dialog box containing a progress indicator as shown in the described embodiment of the present invention.

FIG. 2A is a flowchart illustrating the steps taken in creating, executing, and removing a progress dialog box containing a progress indicator as shown in the described embodiment of the present invention. As described above, a user invokes a function in a main application. In the described embodiment, once the function is invoked, the host thread makes a call or request to a progress dialog class to instantiate or create a progress dialog object in step 200. In the described embodiment, a class is a collection of files from which a set of files or one file make up objects. When an object is instantiated or created from a class, the object has certain properties and methods. Thus, the progress dialog object created has certain properties and methods which, as is described below, allow it to function efficiently for its intended purpose. In this case, it is showing the progress of a job within an application. More generally, the progress dialog class is an object-oriented programming construct that is made up of a group of properties and methods. When an object is instantiated, it is essentially created from a particular class and contains the properties and methods of that particular class. Although the described embodiment is specified in terms of object-oriented programming constructs and rules, the methods and apparatus described can be implemented in other programming environments.

Returning to FIG. 2A, as described above, the host thread is essentially a mode of operation or operation sequence that can be controlled by a host application, such as Sun Service DQC. When a user chooses to initiate a particular task or function in the main application, the application will send a request to the progress dialog class to instantiate a progress dialog object as shown in step 202. Once the dialog object is instantiated, a dialog window is created. This window corresponds or contains information pertaining to the task or function initiated by the user. The dialog object which is manifested on the display monitor as a dialog window has all the properties and methods available to the progress dialog class. Similar to the host thread of the main application, the progress dialog object or window has a corresponding progress dialog thread which is created in step 205 once the dialog object has been instantiated in step 202.

When the host thread sends a request to the progress dialog class to instantiate a dialog object, the host thread passes several parameters to the progress dialog class. One parameter is the host frame object reference. This is necessary because there can be more than one host application running in the computer system. Each host application has a unique host frame object reference. Thus, the progress dialog class can receive an instantiating request from one of several hosts. In its simplest form, this is basically an application identification or name. Another parameter is a window identification object reference which is essentially the progress dialog window object name. In the described embodiment, an optional parameter that may be passed is an object reference to a Java™ applet if the system is running in a browser environment, or if the system does not need to reference a host applet, a NULL value can be passed.

Other parameters needed to instantiate the progress dialog object are related to the format and content of a specific dialog window being created. Recall that a progress dialog window is displayed on the monitor when the user activates a particular function or task. In the described embodiment, the dialog window shown is customized so it contains information specific to a particular function. Thus, the host thread passes to the progress dialog class a text string that is displayed in the dialog box explaining what function has been called and any other data the application designer deems would be informative to the user. In addition, most of the window specific data such as the size of the window, the name of the icons, the dimensions of the icons, and other information that relates to the actual construction of the dialog window is passed from the host thread to the progress dialog class. For example, in FIG.s 1A and 1B, these parameters would have values such as "Progress Dialog" and "Preparing Quote, Please wait . . ." for the text strings, an hour glass symbol for an icon parameter, and a percentage field. In a preferred embodiment, the user or the application developer can set all the specifications for the window or can rely on default measurements and images established by the application designer.

Once the progress dialog object is instantiated from the progress dialog class, thereby creating a dialog window, a progress dialog thread is created as stated earlier in step 205. To create the progress dialog thread, the host thread must pass data to the dialog object reference to the progress dialog thread. The host thread passes the progress dialog object reference (i.e. a progress dialog window identification) and an object reference to the host thread. The progress dialog object reference is essentially the same as the window identification object reference passed from the host thread to the progress dialog class between steps 200 and 202. The object reference to the host thread is the same as the host frame object reference which is also passed from the host thread to the progress dialog class in step 200.

Once the progress dialog object has been instantiated from the progress dialog class, two objects are created: the dialog window, which is essentially the window or box that the user sees on the display monitor, and a progress dialog thread, which is analogous to the host thread for the host or main application. The system executes the progress dialog thread in step 210. Recall that a thread is essentially a flow of instructions. When executing a thread such as the progress dialog thread, the system is asking or requesting that the thread begin executing its series of instructions.

Up to this point, the progress dialog window has been created and the progress dialog thread has been created and executed. However, the dialog window, although created, has not yet been displayed on the screen for the user to see. In step 215, the progress dialog window is displayed on the display monitor. This is done through a standard show method which essentially paints or displays a window on the display monitor. Thus, in FIG. 1A the show method was just invoked to display an empty progress dialog window. The show method is a method of the progress dialog class and, in the described embodiment, is specific to the Java™ programming language to display or paint a window on the screen. Once the progress dialog window is painted on the screen, the host thread is automatically blocked and is no longer in control of the computer system. Up to step 215, the system was under the control of the host thread. However, from step 215, the newly created progress dialog thread controls the flow of operations (until the system reaches step 230, discussed below). Thus, in step 215 the user sees the actual progress dialog window on the display monitor while the task or function that the user invoked is executing. The process of updating the window or, more specifically, the progress indicator, such as a progress bar or some type of meaningful timing icon within the window is described below.

From steps 200 to step 215 the host thread controlled the operation of the system. In step 215, however, once the progress dialog window is painted or displayed on the monitor, the host thread is automatically blocked and the progress dialog thread is activated as shown in step 220. The host thread is blocked because the progress dialog window that is displayed is a modal window and thereby blocks a currently executing host thread and allows the progress dialog thread to control the system. The progress dialog thread is activated after a certain amount of time which is set through a parameter to the dialog thread. Typically the period of time is very short such as 0.001 seconds. The progress dialog thread is activated by the system and not the programmer.

In step 225, the progress dialog thread invokes a callback mechanism, specifically, a run method from the host thread. The run method is a method in the host thread and its primary purpose is to give control back to the host thread to update the progress dialog window as the function, such as preparing a price quote in the example in FIG. 1A and 1B, is running. In the described embodiment, the run method or run interface is a standard way of implementing a callback mechanism in the Java™ programming environment. The run interface passes the progress dialog object reference and the window identification parameter (a unique string). After the progress dialog thread calls the run method, in the described embodiment the host thread resumes execution and updates the progress dialog box as desired by the host thread in step 230 of FIG. 2B. Thus, in step 230 the host thread resumes control of the system.

Figure 2B:
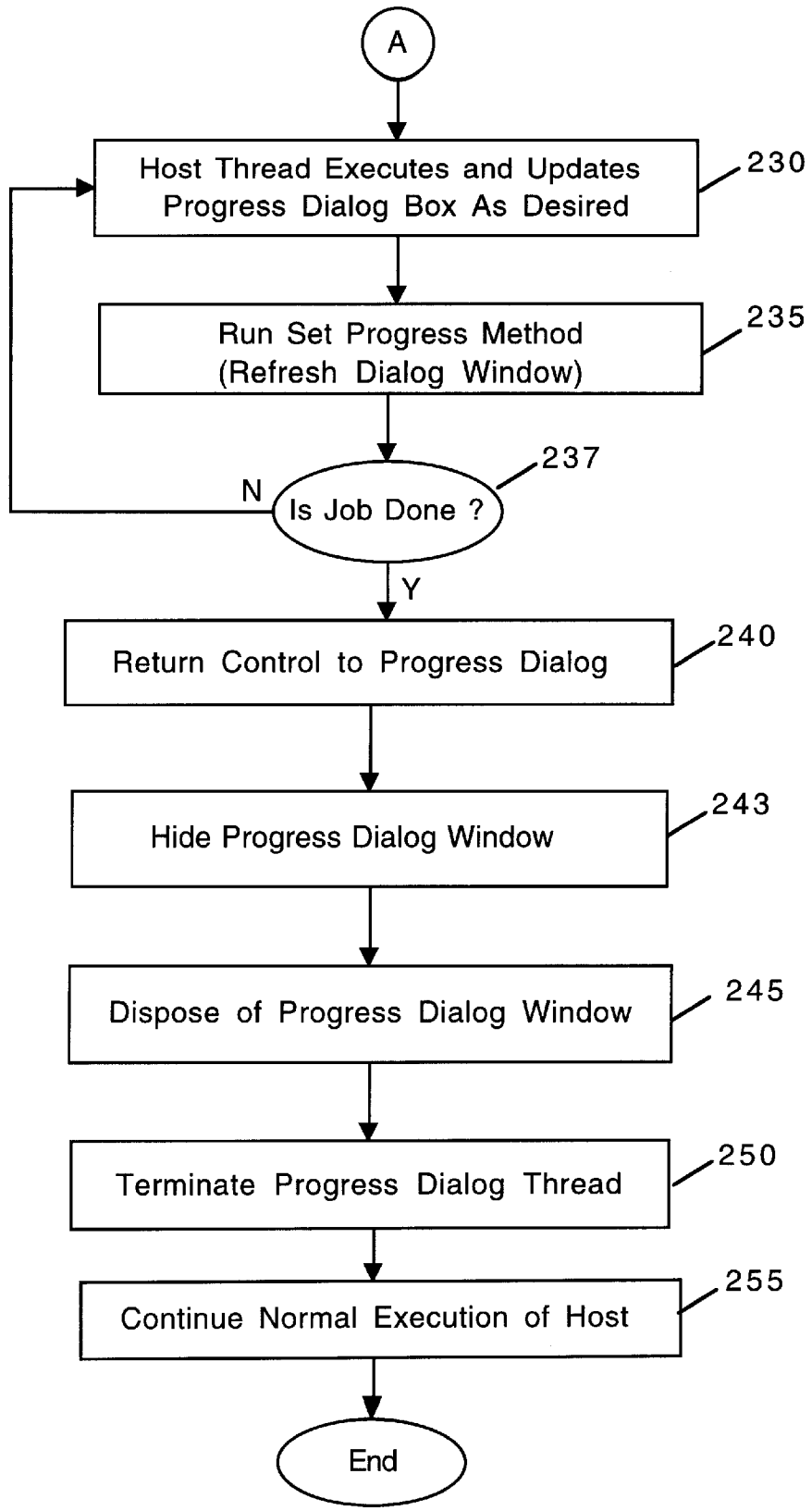

Referring now to FIG. 2B, in step 235, the system runs a set progress method which refreshes or updates the progress dialog window. The set progress method is a standard method that uses one of two modes of updating the progress dialog window. There are a number of different ways an application developer can choose to update a progress dialog window to show progression of a job. As shown in FIG. 1B, one way is to simply display a progress bar and fill it up as the job progresses to completion and have text indicating the percentage complete below the progress bar. Other ways can utilize animation and sound to convey job progression. In one mode of operation, set progress method uses a maximum count and a current count or an index and sets the progress indicator according to a percentage of the task that is completed. Another mode of operation of the set progress method is to give explicit percentages and update the progress dialog window at those specific percentages. In this mode, the host or the main application does the necessary calculations and gives the results to the progress dialog window. For example, the percentages may be set at 20%, 40%, 60%, and 80%.

In either mode of operation, the progress dialog window is refreshed to show the progression of the job's operation as it reaches completion. In step 237, the system checks to see whether the job or the background task is done or 100% complete. If the job is not done, control returns to step 230 where the host thread continues execution and updating the progress dialog window. It then repeats step 235 by running the set progress method to refresh the dialog window. This loop is performed until the job is complete. When the job is done, control goes to step 240 at which point the progress dialog thread resumes control of the operation. From steps 230 to step 237 the host thread is controlling the operation. In step 240, the progress dialog thread resumes control of the system. This is true even though once the job is complete, the progress dialog window is no longer needed. The progress dialog thread needs control at this stage to hide or remove the progress dialog window from the screen as shown in step 243. Once the progress dialog window is hidden, the host thread which was previously blocked is now unblocked and resumes and keeps control of the system from step 245 onward.

In step 245 the progress dialog object which was instantiated from the progress dialog class in step 202 is disposed. Once the progress dialog object is disposed of, its associated thread is no longer needed. Thus, in step 250 the progress dialog thread that was created in step 205 is explicitly stopped or terminated. In the final step 255, the host thread of the main application continues normal execution.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, comparing, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method steps for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method steps.

Figure 3:
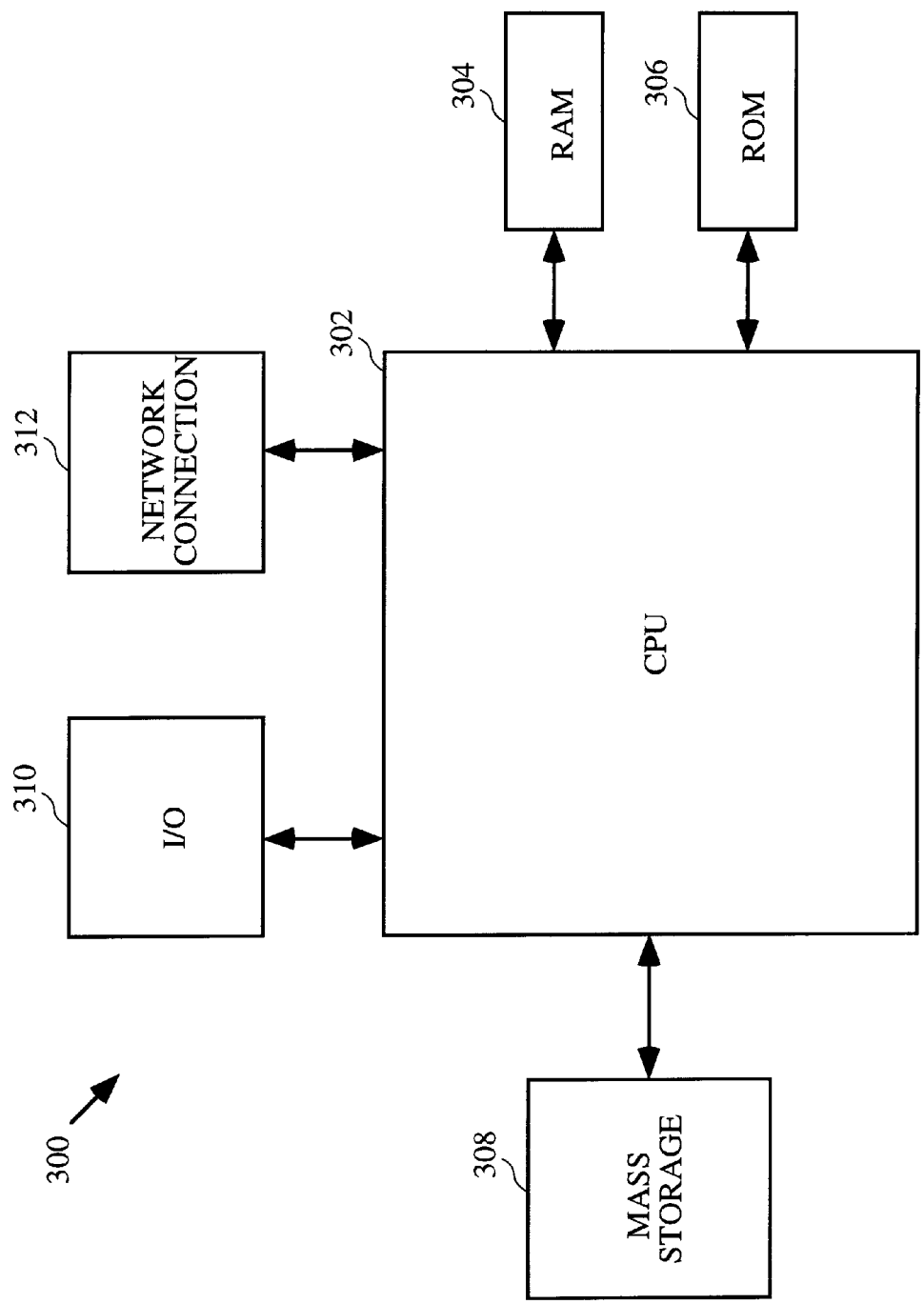
FIG. 3 is a schematic illustration of a general purpose computer system suitable for implementing the present invention.

FIG. 3 is a schematic illustration of a general purpose computer system suitable for implementing the present invention. The computer system includes a central processing unit (CPU) 302, which CPU is coupled bidirectionally with random access memory (RAM) 304 and unidirectionally with read only memory (ROM) 306. Typically RAM 304 includes programming instructions and data, including text objects as described herein in addition to other data and instructions for processes currently operating on CPU 302. ROM 306 typically includes basic operating instructions, data and objects used by the computer to perform its functions. In addition, a mass storage device 308, such as a hard disk, CD ROM, magneto-optical (floptical) drive, tape drive or the like, is coupled bidirectionally with CPU 302. Mass storage device 308 generally includes additional programming instructions, data and text objects that typically are not in active use by the CPU, although the address space may be accessed by the CPU, e.g., for virtual memory or the like. Each of the above described computers further includes an input/output source 310 that typically includes input media such as a keyboard, pointer devices (e.g., a mouse or stylus) and the like. Each computer can also include a network connection 312 over which data, including, e.g., text objects, and instructions can be transferred. Additional mass storage devices (not shown) may also be connected to CPU 302 through network connection 312. It will be appreciated by those skilled in the art that the above described hardware and software elements are of standard design and construction.

Although only a few embodiments of the present invention have been described, it should be understood that the present invention may be embodied in many other specific forms without departing from the spirit or the scope of the present invention. Thus, the method and system of the present invention, although described in terms used in object-oriented programming environments, are not intended to be limited to an object-oriented programming context. Thus, programming constructs analagous to, for example, methods, objects, and properties, found in more traditional programming languages can be used to implement the present invention. The use of object-oriented programming constructs is not intended to limit the spirit or scope of the present invention. In addition, although the user-invoked job is assumed to be invoked within a host application, the job being tracked in the progress dialog window can be a system-invoked job running outside a host application, for example, in an operating system environment. Therefore, the described embodiments should be taken as illustrative and not restrictive, and the invention should be defined by the following claims and their full scope of equivalents.

What is claimed is:

1. A method of executing a job in a multi-threaded computer system using a host thread and displaying a job-specific progress indicator during execution of the job, the method comprising the steps of:

creating a modal progress dialog window using a host thread;

creating a second thread;

displaying the progress dialog window thereby temporarily blocking the host thread;

using the second thread to call a run procedure associated with the host thread;

executing the host thread to execute a job and updating a job-specific progress indicator in the progress dialog window during execution of the job;

determining when the job is done;

terminating the second thread; and continuing normal execution of the host thread after the job is done.

2. A method as recited in claim 1 further comprising the step of using the second thread to hide the progress dialog window after the job is done, wherein:

the second thread is terminated after the progress dialog box is hidden; and the progress dialog window is disposed of by the host thread after the progress dialog box is hidden by the second thread.

3. A method as recited in claim 1 wherein the step of creating a modal progress dialog window further includes the steps of:

instantiating a dialog object, wherein the dialog object creates the modal progress dialog window; and using the dialog object to initiate creation of the second thread.

4. A method as recited in claim 3 wherein the progress dialog window in an instantiation of a progress dialog class and the second thread is a progress dialog thread.

5. A method as recited in claim 1 further comprising the step of:

executing a show procedure to display the progress dialog window on a display monitor.

6. A multi-threaded computer system for execution of a job using a host thread and for the display of a job-specific progress indicator during execution of the job, the system comprising:

a mechanism for creating a modal progress dialog window using a host thread;

a mechanism for creating a second thread;

a device for displaying the progress dialog window thereby temporarily blocking the host thread;

a device for calling a run procedure associated with the host thread that uses the second thread;

a mechanism for executing the host thread to execute a job and for updating a job-specific progress indicator in the progress dialog window during job execution;

a device for determining when the job is done; and a device for terminating the second thread thereby continuing normal execution of the host thread.

7. A computer system as recited in claim 6 further including:

a mechanism for hiding the progress dialog window after the job is done using the second thread wherein:

the mechanism for hiding the progress dialog window terminates the second thread after the progress dialog box is hidden and uses the host thread to dispose of the progress dialog window after the second thread hides the progress dialog box.

8. A computer readable medium including programmed instructions arranged to execute a job using a host thread and to display a job-specific progress indicator during execution of the job, the computer readable medium including programmed instructions for:

creating a modal progress dialog window using a host thread;

creating a second thread;

displaying the progress dialog window thereby temporarily blocking the host thread;

using the second thread to call a run procedure associated with the host thread;

executing the host thread to execute a job and update a job-specific progress indicator in the progress dialog window during execution of the job;

determining when the job is done;

terminating the second thread; and continuing normal execution of the host thread.

9. A computer readable medium as recited in claim 8 further including programming instructions for:

terminating the second thread after the progress dialog box is hidden; and causing the host thread to dispose of the progress dialog window after the progress dialog box is hidden by the second thread.

10. A computer readable medium as recited in claim 8 further including programming instructions for:

instantiating a dialog object, wherein the dialog object creates the modal progress dialog window; and using the dialog object to initiate creation of the second thread.

11. A method of displaying and updating a progress indicator showing progress of a job while the job is running on a computer system, the method comprising:

executing a job within a host application using a host thread;

alternating control of a modal progress dialog box containing a progress indicator between the host thread and a progress dialog thread, such that the progress dialog box is updated when the host thread has control of the progress dialog box;

executing a set progress procedure using the host thread to update the progress dialog box while the job is running;

determining when the job has completed; and hiding the progress dialog window using the progress dialog thread when it is determined that the job has completed;

disposing of the progress dialog window using the host thread after the progress dialog window is hidden; and using the host thread to terminate the progress dialog thread and continue execution of the host application.

* * * * *